(12) United States Patent
Chanson et al.

(10) Patent No.: US 9,946,522 B1
(45) Date of Patent: Apr. 17, 2018

(54) GENERATING CODE FOR REAL-TIME STREAM PROCESSING

(71) Applicant: International Business Machines Corporation, Armonk, NY (US)

(72) Inventors: Frederic Chanson, Bois Colombes (FR); Saniya Ben Hassen, Montpellier (FR); Marc P. Yvon, Antony (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/381,236

(22) Filed: Dec. 16, 2016

(51) Int. Cl.
 *G06F 9/45* (2006.01)

(52) U.S. Cl.
 CPC ...................................... *G06F 8/41* (2013.01)

(58) Field of Classification Search
 None
 See application file for complete search history.

(56) References Cited

U.S. PATENT DOCUMENTS

| | | | | |
|---|---|---|---|---|
| 5,798,718 A * | 8/1998 | Hadady | ................... | H03M 7/46 341/106 |
| 6,622,301 B1 | 9/2003 | Hirooka et al. | | |
| 7,945,540 B2 * | 5/2011 | Park | ................. | G06F 17/30533 707/610 |
| 8,667,459 B2 | 3/2014 | Vlaovic et al. | | |
| 8,775,344 B2 | 7/2014 | Blount et al. | | |
| 8,843,524 B2 | 9/2014 | Branson et al. | | |
| 9,015,339 B2 * | 4/2015 | Branson | .................. | H04L 47/25 709/234 |
| 9,122,725 B2 | 9/2015 | Branson et al. | | |
| 9,256,646 B2 * | 2/2016 | Deshmukh | ........ | G06F 17/30442 |
| 9,436,736 B2 * | 9/2016 | Branson | .............. | G06F 17/3053 |
| 2005/0273772 A1 * | 12/2005 | Matsakis | ................... | G06F 8/41 717/136 |
| 2009/0119641 A1 * | 5/2009 | Ramsey | ............ | G06F 17/30421 717/114 |
| 2010/0293532 A1 * | 11/2010 | Andrade | ............ | G06F 11/1438 717/140 |
| 2011/0314256 A1 * | 12/2011 | Callahan, II | .............. | G06F 8/45 712/17 |

(Continued)

OTHER PUBLICATIONS

Fernandez, "Integrating Scale Out and Fault Tolerance in Stream Processing using Operator State Management", 2013, SIGMOD'13, ACM.*

(Continued)

*Primary Examiner* — Hossain Morshed
(74) *Attorney, Agent, or Firm* — Law Office of Jim Boice

(57) ABSTRACT

A computer-implemented method for generating code for real-time stream processing, where data is streamed in tuples, and where each tuple has a timestamp and a value. One or more processors receive source code. The source code includes: code to be applied in a sequential series to one or more tuples; a definition of a size of a sequence of tuples to be processed as a processing window; and a size of a sequence of earlier tuples that a current tuple depends upon as a dependence window. Processor(s) generate the code for real-time stream processing by: buffering received time sequence tuples in a buffer in accordance with the processing window and the dependence window; and converting the code to be sequentially applied to the one or more tuples into code for buffered tuples with a loop construct.

9 Claims, 9 Drawing Sheets

(56) References Cited

U.S. PATENT DOCUMENTS

2012/0130940 A1    5/2012  Gattani et al.
2017/0339203 A1\*  11/2017  Kekre .................... H04L 65/60

OTHER PUBLICATIONS

P. Mell et al., "The NIST Definition of Cloud Computing", National Institute of Standards and Technology, Information Technology Laboratory, Sep. 2011, pp. 1-7.
Anonymous, "Edgent: Overview: Apache Edgent Overview" The Apache Software Foundation, <edgent.apache.org>, Retrieved December 16, 2016, pp. 1-3.
A.A. Safaei, "Real-Time Processing of Streaming Big Data", Springer, Real-Time Systems, 2016, pp. 1-44 (Abstract Only).
A.A. Safaei, "Real-Time Processing of Streaming Big Data", Springer, Real-Time Systems, 2016, pp. 1-44.

\* cited by examiner

500

| 0 | 1 | 2 | 3 | 4 | 5 | 6 | 7 | 8 | 9 | 10 |
|---|---|---|---|---|---|---|---|---|---|---|
| 525 | 501 | 502 | 503 | 504 | 505 | 506 | 507 | 508 | 509 | 510 |
| $T_1, V_1$ | $T_2, V_2$ | $T_3, V_3$ | $T_4, V_4$ | $T_5, V_5$ | $T_6, V_6$ | $T_7, V_7$ | $T_8, V_8$ | $T_9, V_9$ | $T_{10}, V_{10}$ | $T_{11}, V_{11}$ |
| 511 | 512 | 513 | 514 | 515 | 516 | 517 | 518 | 519 | 520 | 521 |

| 0 | 1 | 2 | 3 | 4 | 5 | 6 | 7 | 8 | 9 | 10 |
|---|---|---|---|---|---|---|---|---|---|---|
| 525 | 501 | 502 | 503 | 504 | 505 | 506 | 507 | 508 | 509 | 510 |
|  | $T_{11}, V_{11}$ 521 |  |  |  |  |  |  |  |  |  |

| 0 | 1 | 2 | 3 | 4 | 5 | 6 | 7 | 8 | 9 | 10 |
|---|---|---|---|---|---|---|---|---|---|---|
| 525 | 501 | 502 | 503 | 504 | 505 | 506 | 507 | 508 | 509 | 510 |
|  | $T_{11}, V_{11}$ 521 | $T_{12}, V_{12}$ 522 | $T_{13}, V_{13}$ 523 | $T_{14}, V_{14}$ 524 |  |  |  |  |  |  |

FIG. 5C

GENERATING CODE FOR REAL-TIME STREAM PROCESSING

BACKGROUND

The present invention relates to generating code for real-time stream processing, and more specifically, to real-time stream processing based on processing and dependence windows.

Real-time data series are streaming values issued in real time. A typical example of time series data are those produced by Internet of Things (IoT) devices, for example, equipment, vehicles, systems, appliances, devices and sensors of all kinds. The IoT devices send streaming measures in the form of tuples, each tuple having a timestamp and a value.

For example, a motion detector will send a timestamp and a value indicating whether any motion was detected at the specified time. In this case, the values are not equally spaced as they depend on a change of state in the space covered by the motion detector. In other cases, such as temperature sensors, data is sent at regular intervals of time, for example, every five minutes, producing equally spaced data.

In the fields of data mining and statistics, time series are treated as historical data; they are processed after being collected. With the current rise of IoT the need for processing time series data in real time becomes critical.

SUMMARY

According to an aspect of the present invention there is provided a computer-implemented method for generating code for real-time stream processing. A computer-implemented method generates code for real-time stream processing, where data is streamed in tuples, and where each tuple has a timestamp and a value. One or more processors receive source code. The source code includes: code to be applied in a sequential series to one or more tuples; a definition of a size of a sequence of tuples to be processed as a processing window; and a size of a sequence of earlier tuples that a current tuple depends upon as a dependence window. Processor(s) generate the code for real-time stream processing by: buffering received time sequence tuples in a buffer in accordance with the processing window and the dependence window; and converting the code to be sequentially applied to the one or more tuples into code for buffered tuples with a loop construct.

According to a further aspect of the present invention there is provided a system for generating code for real-time stream processing wherein data is streamed in the form of tuples wherein each tuple has a timestamp and a value, comprising: a processor and a memory configured to provide computer program instructions to the processor to execute the function of the components; a code receiving component for receiving source code including: code to be applied to one or a set of tuples at a time in a series; a defined size of a sequence of tuples to be processed as a processing window; and a size of a sequence of earlier tuples a current tuple depends upon as a dependence window; and a code generating component for generating code including: a buffering component for buffering received time sequence tuples in a buffer in accordance with the processing window and the dependence window; and a conversion component for converting the code to be applied to one or a set of tuples at a time into code for buffered tuples with a loop construct.

According to a further aspect of the present invention, there is provided a computer system that has one or more processors, one or more computer readable memories, and one or more computer readable storage mediums, and program instructions stored on at least one of the one or more storage mediums for execution by at least one of the one or more processors via at least one of the one or more memories. The stored program instructions include: program instructions to receive source code, where the source code includes: code to be applied in a sequential series to one or more tuples; a definition of a size of a sequence of tuples to be processed as a processing window; and a size of a sequence of earlier tuples that a current tuple depends upon as a dependence window. The stored program instructions also include program instructions to generate code for real-time stream processing by: buffering received time sequence tuples in a buffer in accordance with the processing window and the dependence window; and converting the code to be sequentially applied to the one or more tuples into code for buffered tuples with a loop construct.

According to a further aspect of the present invention there is provided a computer program product for generating code for real-time stream processing, where data is streamed in the form of tuples, and where each tuple has a timestamp and a value. The computer program product includes a computer readable storage medium having program instructions embodied therewith, the program instructions executable by a processor to cause the processor to: receive source code, where the source code includes: code to be applied in a sequential series to one or more tuples; a definition of a size of a sequence of tuples to be processed as a processing window; and a size of a sequence of earlier tuples that a current tuple depends upon as a dependence window. The program instructions executable by the processor further cause the processor to generate code for real-time stream processing by: buffering received time sequence tuples in a buffer in accordance with the processing window and the dependence window; and converting the code to be sequentially applied to the one or more tuples into code for buffered tuples with a loop construct.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

FIGS. 5A to 5C are schematic diagrams illustrating a buffer in accordance with the present invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The term "stream" is used to refer to real-time data series of tuples, each tuple having a timestamp and a value. Processing a stream ideally takes into account the two aspects of the number of tuples that are to be processed at a time and the dependence between tuples during processing. The Number of Tuples to be Processed at a Time.

Processing a sequence of tuples in a stream generally includes three phases: the acquisition of the data (pre-processing); the actual processing of the data; and the cleanup of the data (post-processing). The three phases are illustrated in FIG. 1A, which illustrates output rate versus processing overhead.

Figure 1A:
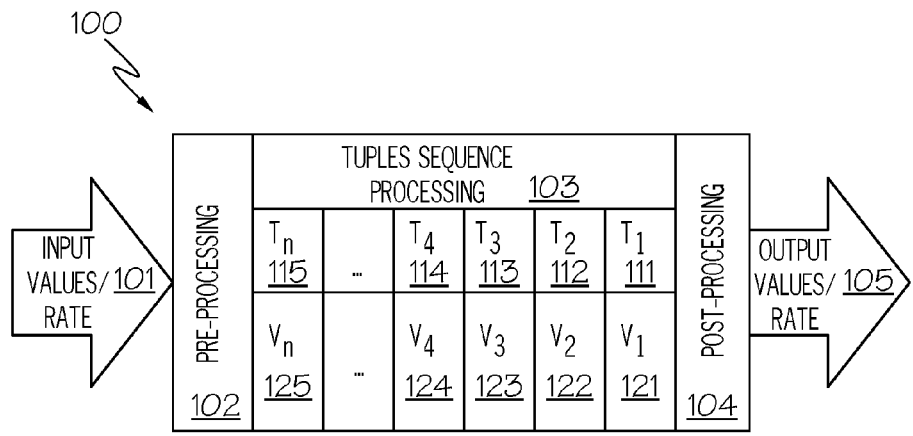
FIGS. 1A and 1B are schematic diagrams illustrating concepts in accordance with the present invention.

FIG. 1A shows a schematic diagram 100 of processing a sequence of tuples. Input values at a given rate 101 may be input into a pre-processing stage 102. The actual processing of the data may be carried out by a tuples sequence processing stage 103. This may be followed by a post-processing stage 104 which outputs output values at a given rate 105.

The tuples sequence processing stage 103 is shown with tuples of timestamps 111-115 $T_1$ to $T_n$ and values 121-125 $V_1$ to $V_n$.

The time required for the pre-processing stage 102 and the post-processing stage 104 is considered an overhead, because it is not dedicated to the actual processing of the values. The overhead can have a significant impact on the rate at which the output will be delivered.

While processing a stream, a balance is required as, on one hand, the larger the sequence the lower the global overhead and, on the other hand, the larger the sequence the lower the output rate. There is a compromise that needs to be found between the sequence size and the output rate and the described method and system accommodate this balance by enabling a programmer to specify the processing window size.

The Dependence Between the Tuples During Processing.

Figure 1B:
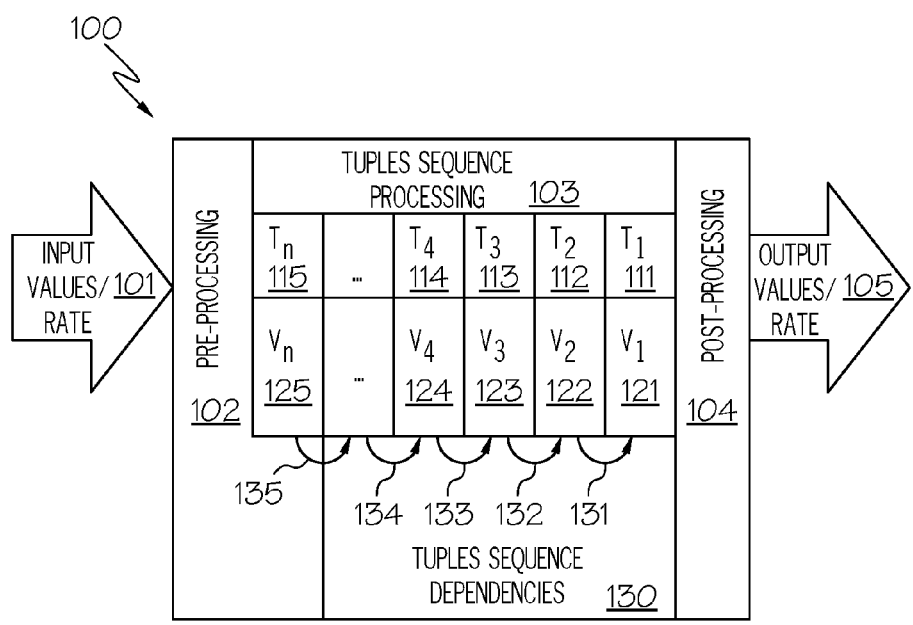

Processing a tuple in a stream may require the availability of previously acquired data. This introduces processing dependencies between tuples. Dependencies between tuples during tuples processing are illustrated in FIG. 1B which shows the schematic diagram 100 of FIG. 1A with added dependencies.

Tuples sequence dependencies 130 are shown with dependencies 131-135 where, in this example, each tuple depends on the preceding one in the sequence. For example, a temperature sensor sends temperature readings every 15 minutes and it is required to compute the difference between the current temperature and the one sent previously. In this case, the processing of each value requires the previous value. It will be appreciated that dependencies may take many forms and may require a defined number or duration of previous tuple values.

Addressing the two aspects stated above, the described method and system provide means for simplifying the generation of code of applications that implement stream processing while helping to improve their performance.

The described system provides tools to programmers who write applications using streams to reduce the processing overhead and simplify the applications code. The programmer is enabled to write the processing code almost as if only one tuple was being processed at a time, i.e., in a tuple-centric way. This applies even if tuples are processed in bulk and the processing of tuples depends on previously received ones.

With these tools, the processing of a stream is summarized as the following steps carried out by a programmer:

The programmer writes the code for the processing of one tuple at a time or a set of tuples at a time, in a tuple-centric approach.

The programmer specifies the size in the form of the number or duration each sequence of tuples must have before being processed. This sequence of tuples is called a processing window.

The programmer specifies the dependencies between the current tuple and other tuples as follows. The size may be specified in terms of a number of earlier tuples the current one depends on or in terms of duration, i.e., the time interval between the earliest dependent tuple and the current one. This specification of dependencies is called a dependence window.

A programming system transparently handles the processing of the stream using the programmer specified code, processing window and dependence window. The programming system may handle buffering of the time series data and the dependencies for each tuple or set of tuples being processed.

The programming system may also handle the processing of boundary tuples. Boundary tuples are the first tuples received for which there exists no dependent tuples, as specified by the dependence window. Considering again the example of computing the temperature difference between two consecutive temperature measures, the computation cannot be applied to the first temperature measure. It can be applied starting from the second measure only. The programming system starts the actual processing with the first tuple for which all dependencies exist. It ignores all previously received tuples. Alternatively, a processing procedure may be specified by the programmer for boundary tuples.

The programmer specifies two windows sizes or durations and writes a tuple-centric function code, as if tuples were processed one at a time. The programming system converts the programmer's tuple-centric code into processing code using a buffer of the processing window and dependence windows.

Overhead code is handled by programming systems in the form of executable code generating systems such as compilers and pre-processors, and/or runtime systems. Overhead code is additional object code generated by a compiler or pre-processor to provide machine code to be executed by a specific processor. This code includes translations of generic instructions listed in cross-platform code, and is tailored for execution on a specific platform or architecture. In this use, overhead code is, additionally, code generated to handle streaming data for processing throughput with tuple dependencies.

A stream is considered with a function, procedure, or other processing abstraction that must be applied to the tuples in the stream. The processing window is defined as the number of consecutive tuples that should be processed at a time. The dependence window is defined as the number of consecutive previous tuples that are needed to process a tuple. Alternatively, the processing window and dependence window sizes may be defined as durations.

From a programmer's point of view, a notation may be used that allows her/him to define:
Code that is to be applied to every tuple in a stream, except for boundary tuples.
The size or duration of the processing window. It must be >0.
The size or duration of the dependence window. It must be ≥0. If it is equal to zero, there are no dependencies between a tuple and previous ones.

The notation may be an extension to any existing language such as sequential languages or stream-based languages.

The programming system may be a pre-processor or a compiler that exploits constructs in a new or extended programming language. The programming system may generate the code by using a library on top of an existing programming language. The programmer may then be provided with one or more packages to include in her/his program.

From the programming system point of view, the compiler or pre-processor generates the code to apply the processing of tuples in the order of their arrival time using the tuples timestamps, buffering the tuples using the information as specified by the programmer regarding the processing window, and buffering all tuples that are required to process the current one using the information specified by the programmer regarding the dependence window.

A runtime system may also ensure that the data structure containing the current window, such as an array, is properly constructed and does not generate runtime errors as long as the indices accessed are consistent with the definition of the windows. The data structure may hold up to pws+dws tuples, where pws and dws are the processing window size and the dependence window size respectively.

Figure 2:
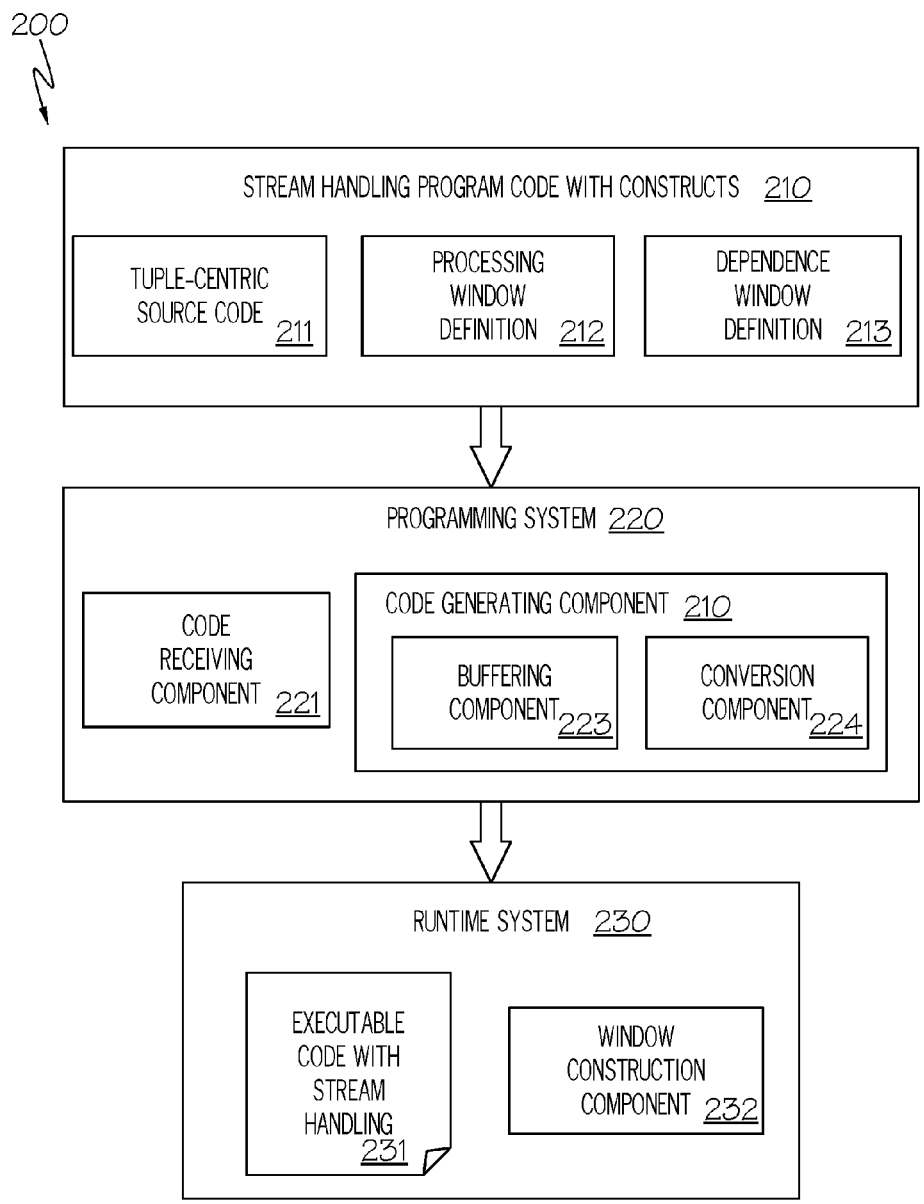
FIG. 2 is a block diagram of an example embodiment of a system in accordance with the present invention.

FIG. 2 shows a schematic diagram 200 of stream handling program generation using the described system.

A stream handling program code with constructs 210 may be written by a programmer including tuple-centric source code 211 to be applied to every tuple or a set of tuples in a series and defined in a tuple-centric way, and constructs in the form of a processing window definition 212 and a dependence window definition 213.

A programming system 220 including a compiler or pre-processor may generate binary or executable code based on the stream handling program code with constructs 210.

The programming system 220 may be a pre-processor used to generate code into a high-level language, such as Java (Java is a trade mark of Oracle Corporation), which would be then compiled into machine dependent executable code. Alternatively, the programming system 220 may be a high-level language compiler that may be extended to compile the processing and dependence windows construct without the need for a pre-processor.

The programming system 220 may include a code receiving component 221 for receiving the stream handling program code with constructs 210 as provided by a programmer using a notation enabling definition of the constructs.

The programming system 220 may include a code generating component 222 including a buffering component 223 for providing a buffer for the defined processing window 212 and dependence window 213 of a tuple stream, and a conversion component 224 for converting the tuple-centric source code 211 into processing code for handling the stream of tuples with buffering. Further details of the code generating component 222 are provided in relation to FIG. 3.

A runtime system 230 may run the compiled executable code 231 with stream handling 231 using a window construction component 232 for ensuring that the data structure containing the processing window and dependence window is properly constructed.

Figure 3:
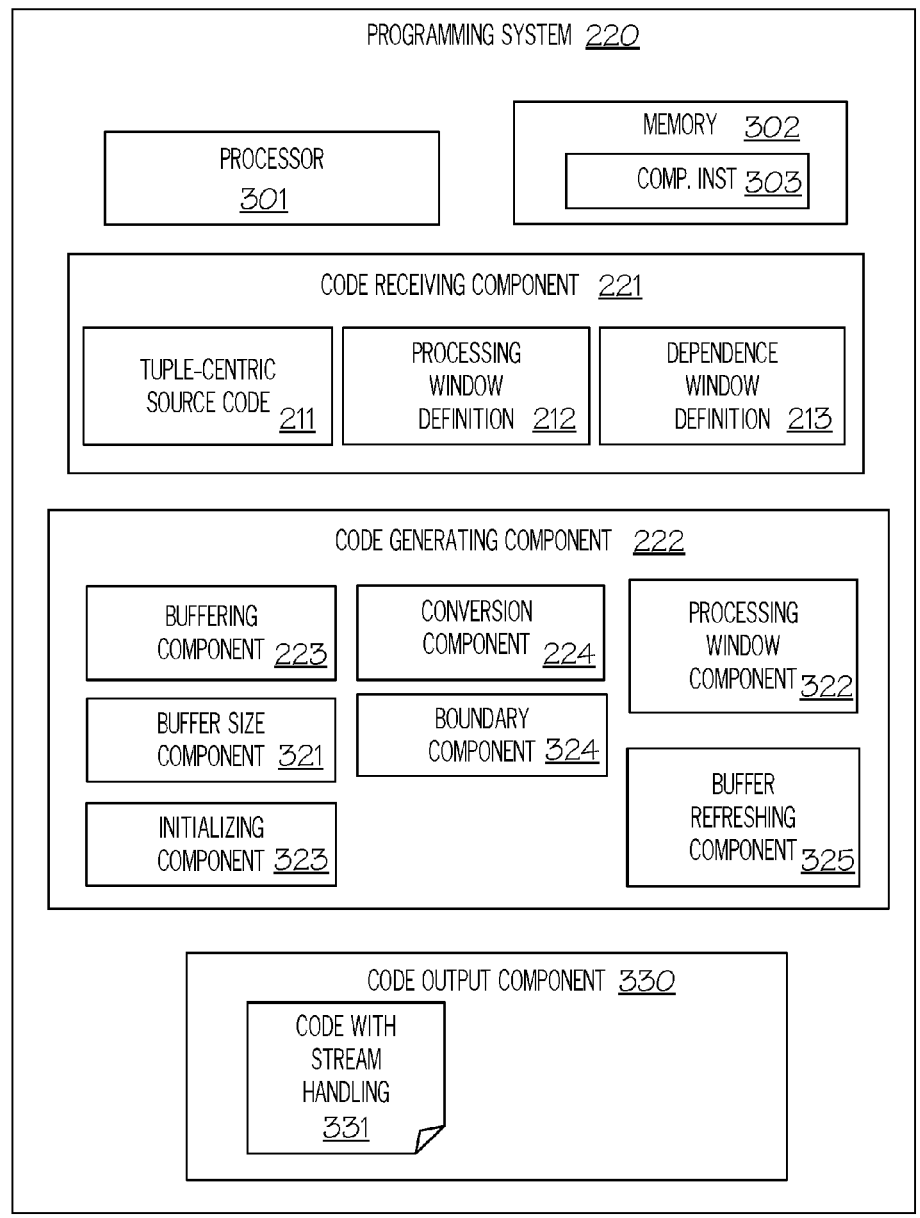
FIG. 3 is a block diagram of an example embodiment of a programming system in accordance with the present invention.

Referring to FIG. 3, a programming system 220 in the form of a compiler or pre-processor may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The programming system 220 may be a compiler in the form of a computer program or a set of programs that transforms source code written in a programming language into another computer language, with the latter often having a binary or executable form known as object code. Source code is converted to create an executable program.

Alternatively, the programming system 220 may be a pre-processor in the form of a program that processes its input data to produce output that is used as input to another program. The output is said to be a pre-processed form of the input data, which is often used by some subsequent programs like compilers. The processing may be performed on source code before the next step of compilation.

The code receiving component 221 of the programming system 220 may receive the tuple-centric source code 211 to be applied to every tuple or set of tuples, the processing window definition 212 and the dependence window definition 213, all as defined by a programmer. The processing window definition 212 may define the size of a sequence of tuples and the dependence window definition 213 may define the size of a sequence of earlier tuples a current tuple depends upon.

The code generating component 222 of the programming system 220 includes a buffering component 223 and a conversion component 224 as shown in FIG. 2. In addition, the code generating component 222 may include a buffer size component 321. The processing window definition 212 and the dependence window definition 213 may define the window size by a number of tuples or by a duration of time of arrival of the tuples. In one embodiment, in which the windows are defined by a number of tuples, the buffer size component 321 may define the size of the buffer with a maximum size of the number of tuples in the processing window plus the number of tuples in the dependence window. In an alternative embodiment in which the dependence window is defined by a duration of time, the buffer size component may dynamically compute the size of the buffer.

The code generating component 222 may include a boundary component 324 for generating code for processing boundary tuples that do not have the required dependency tuples available.

The code generating component 222 may also include an initializing component 323 for initializing the processing of tuples to a latest dependency tuple in the buffer.

The code generating component 222 may also include a processing window component 322 for generating code for checking that all tuples in a processing window have been buffered and for applying the converted code to each tuple in the processing window. The code generating component 222 may further include a buffer refreshing component 325 for generating code for, once a processing window is processed, keeping the remaining dependence window tuples in the buffer for the next processing window of tuples.

The programming system 220 may include a code output component 330 for outputting code 331 with stream handling. In the case of the programming system 220 in the form of a compiler, the code output component 330 may output executable code to a runtime system. In the case of the programming system 220 being a pre-processor, the code output component 330 may output code to a compiler for further compiling into executable code.

Figure 4A:
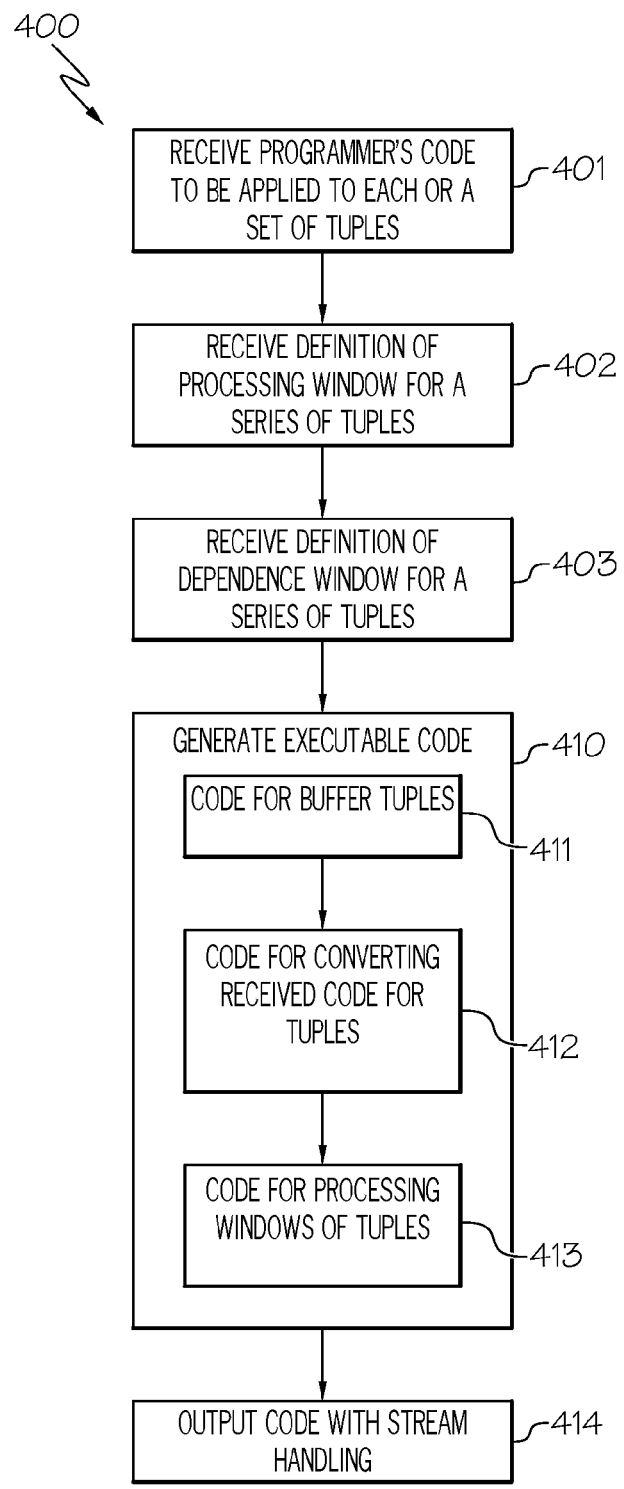
FIGS. 4A and 4B are flow diagrams of example embodiments of aspects of a method in accordance with the present invention.

Referring to FIG. 4A, a flow diagram 400 shows an example embodiment of the described method as carried out by a programming system 220.

Programmer's code may be received 401 including code to be applied to each tuple or set of tuples in a series in a tuple-centric manner. A definition of a processing window may also be received 402 for the series. A definition of a dependence window may also be received 403 for the series.

Executable code may be generated 410 by the programming system 220 including code for buffering tuples (block 411) in accordance with the defined processing window and dependence window, code for converting the received tuple-centric code into code to process the tuples (block 412), and code for applying the processing in processing window batches including the dependencies (block 413). Further details of the code generation are provided in relation to FIG. 4B.

The method may output generated code with stream handling (block 414).

Figure 4B:
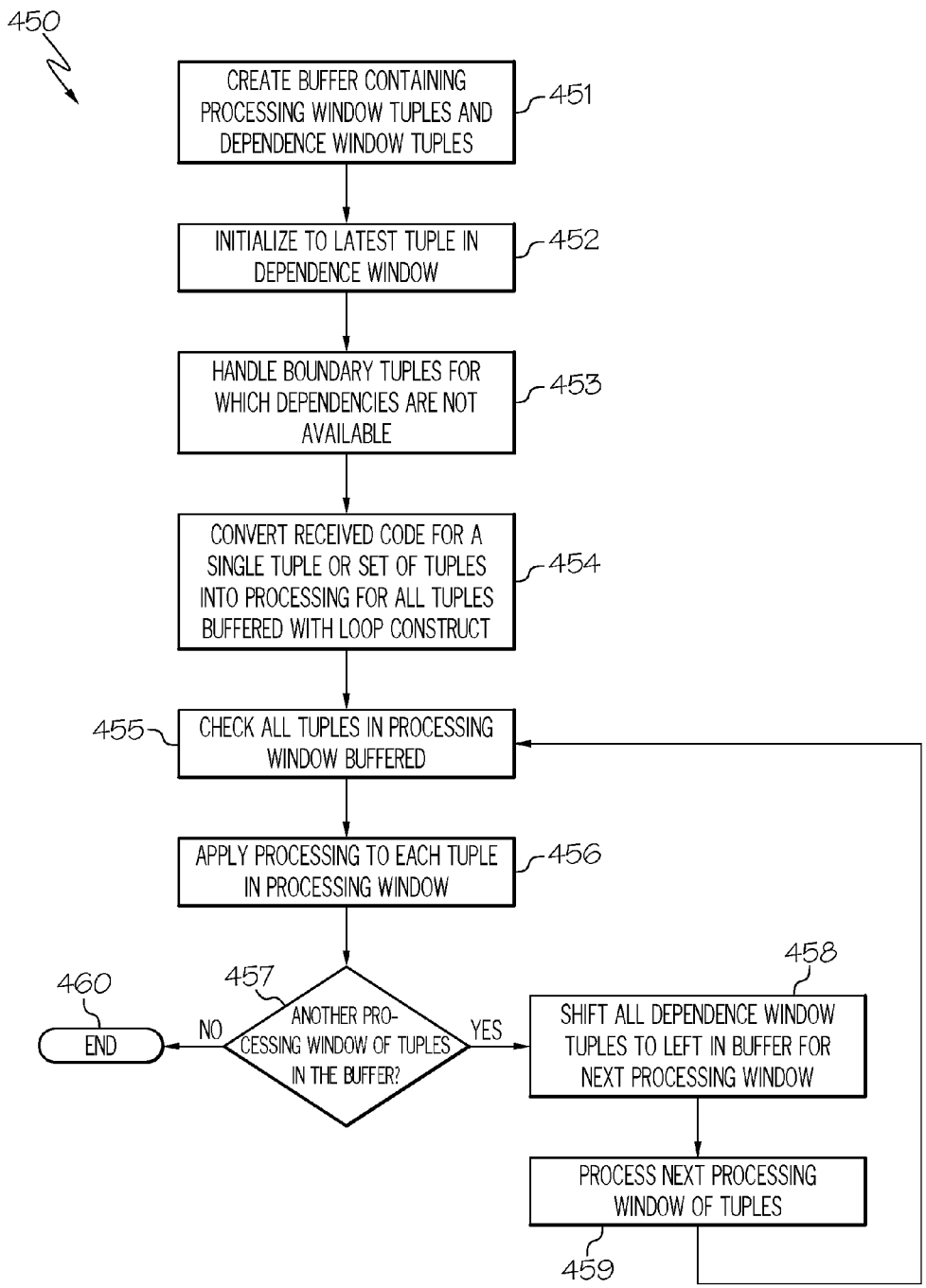

Referring to FIG. 4B, a flow diagram 450 shows an example embodiment of the described method as carried out by the code generating component 222 of the programming system 220.

The method may create a buffer, for example in the form of a table or an array, for the processing window tuples and the dependence window tuples (block 451). In an embodiment in which the size of the processing window and the dependence window are defined by a number of tuples, the maximum size of the buffer may be the number of tuples in the processing window plus the number of tuples in the dependence window. In an embodiment in which the size of the dependence window is defined by a duration of time, the size of the buffer may be dynamically determined.

The buffer may be initialized to the latest tuple in the dependence window (block 452). This is the starting point for processing tuples where all the required dependency tuples are available in the buffer. The method may handle boundary tuples for which all the required dependency tuples are not available (block 453).

The method may convert the received code from the programmer for a single tuple or a set of tuples into processing for all tuples buffered with a loop construct (block 454). This conversion may specify an up-call that handles individual tuples in an equivalent manner to that specified by the programmer with notation modification of native language constructs.

The method may then define code for checking that all the tuples in a processing window are buffered (block 455) and applying the processing to each tuple in the processing window (block 456).

The method may determine if there is another processing window of tuples in the buffer (block 457) and, if so, may shift all dependence window tuples to the left in the buffer for the next processing window (block 458) and may proceed to process the next processing window of tuples (block 459). The process returns to block 455 to check that all the tuples in the next processing window are buffered and, as illustrated in block 456, applies the processing to each tuple in the next processing window.

If it is determined that there are no further processing windows of tuples, the method may end (block 460).

Referring to FIGS. 5A to 5C, schematic diagrams show a buffer 500 at different stages of processing. The buffer 500 includes indices 525 and 501-510. In this example, a processing window size is defined as 10 and one previous tuple is required for dependency giving a dependence window size of 1. The buffer 500 has a size of 11 values.

In FIG. 5A, the buffer 500 is shown with 11 values 511-521 with an earliest buffer value 511 of the form $t_1$, $v_1$ and a latest buffer value 521 of $t_{11}$, $v_{11}$. The earliest buffer value 511 of $t_1$, $v_1$ is a boundary tuple because its dependencies cannot be satisfied.

FIG. 5B shows the buffer 500 after the 10 latest values 512-521 have been processed and the buffer 500 has been shifted. Buffer value 521 of $t_{11}$, $v_{11}$ is shifted to the left in the buffer to index 501 as it is required for the processing of a next received tuple 522 of $t_{12}$, $v_{12}$.

FIG. 5C shows the buffer 500 and contents after three more values 522-524 of $t_{12}$, $v_{12}$, $t_{13}$, $v_{13}$ and $t_{14}$, $v_{14}$ have been acquired for the next processing window.

Temperature Difference Example

The described method and system are illustrated through a first example. The example computes the difference between a temperature reading and the previous one. Each tuple contains (timestamp, temperature).

Pseudo-code for the computation as written by the programmer is shown below:

```
# Tuple structure definition.
structure Tuple {
    timestamp tsp;
    real temperature;
}
/* Definition of the up-call to be applied to each tuple in
   the processing window. T[ ] refers to the processing
   window. i refers to the index of the "current" tuple. */
ComputeTemperatureDifference<Tuple T[ ],integer i,
    pws=10, dws=1>(oc OutgoingChannel) {
    /* Computation of the temperature difference between
       the current tuple and the previous one. The program-
       mer need not worry about boundary tuples. */
    /* The result of the computation is sent over the output
       channel passed as an argument to the up-call. */
    oc.send(T[i].tsp,    T[i].temperature−T[i−1].tempera-
       ture);
}
Main {
. . .
# Creation of the output channel.
oc=new OutgoingChannel( )
/* Creation of the input channel, from which the stream is
   to be read "forever". The up-call and the output channel
   are both passed as arguments to the input channel
   constructor. */is =new IncomingChannel(Compute-
   TemperatureDifference( ) oc);
. . .
}
```

The function ComputeTemperatureDifference accesses the current temperature reading using T at index i and the previous reading using T at index i−1. pws specifies the processing window size. dws specifies the dependence window size.

In the main code, the first statement instantiates an output channel on which the output values must be sent: the timestamp of the current tuple and the temperature difference. The second statement creates an input channel of tuples on which the runtime system must apply ComputeTemperatureDifference( ).

There exist mechanisms to stop the processing of incoming tuples. Below, a few non-exhaustive alternatives are described.

Other alternative that processes 1000 tuples and exists
    ic=new IncomingChannel(ComputeTemperatureDifference( ) oc, 1000);
    # Other alternative that processes 1 day of tuples and exists
    ic=new IncomingChannel(ComputeTemperatureDifference( ) oc, 1, "days");
    # Other alternatives may stop processing after a timeout specified by the programmer.

Using the temperature difference example, the generated code is illustrated below. All the code that has been written or indirectly specified by the programmer is in bold. The remainder of the code is generated by the programming system, with explanations given in the form of comments.

```
    structure Tuple {
        timestamp tsp;
        real temperature;
    }
    pws=10;
    dws=1;
    /* The programming system creates the table in which
       tuples will be buffered. The maximum size of the table
       containing the processing and dependence windows is
       equal to pws+dws */
    MaxWS=pws+dws;
    currentWS=0; // Points to the latest tuple in a dependence window
    structure Tuple T[MaxWS] // structure containing both
        dependence and processing windows
    /* The programming system specifies the up-call that
       handles individual tuples, in almost the same way as it
       is declared by the programmer. Only the notation is
       modified to use the native language constructs. */
    ComputeTemperatureDifference(Tuple T[ ], integer i,
        integer pws, integer dws, oc OutgoingChannel) {
        oc.send(T[i].tsp, T[i].temperature-T[i-1].temperature);
    }
    /* The programming system converts the processing of
       individual tuples, as shown above, into the processing
       of all tuples buffered with a loop construct. The processing starts at index dws of the buffer. */
    onGettingTuple (Tuple tupleReceived, OutgoingChannel oc) {
        T[currentWS]=tupleReceived;
        currentWS ++;
        // Check if all tuples in the processing window have
        //   been buffered.
        if currentWS==MaxWS {
            // If so, apply processing to each tuple in the processing
            //   window.
            for i=dws to dws+pws-1 do {
                ComputeTemperatureDifference(T, i, pws, dws, oc);
            }
            /* Then the programming system shifts the latest dws
               tuples of the processing window to the left in the
               buffer. They constitute part or all of the dependence window of the next processing window. */
            shift latest dws tuples in T to T[0] to T[dws-1];
            // Update the pointer to the latest tuple in the dependence window.
            currentWS=dws;
        }
    }
    Main {
        ...
        OutgoingChannel oc=new OutgoingChannel( )
        ic=new IncomingChannel(onGettingTuple( ) oc);
        ...
    }
```

In another example, the use of a duration rather a number of tuples for the specification of dependence windows is illustrated.

Consider the example where each tuple contains a timestamp and a data structure called Weather representing instant weather conditions (temperature, wind force and direction, humidity, sunshine, etc.). The tuples arrive every 15 minutes. The weather forecast is to be determined in the next hour depending on the weather during the past 6 hours and statistical weather forecast models. The resulting weather forecast is appended to a file.

The pseudo-code for this example as provided by a programmer is shown below.

```
structure Weather {
    ...
}
/* Use models to forecast whether in the next hour as up-call*/
Weather WeatherForecast(Weather[ ] weatherHistory, integer i) {
    Weather w;
    w = ... # use models for weather forecast
    return w;
}
# The processing window size is 1.
# The dependence window is of 6 hours
NextHourForecast< Weather[ ] wh, integer i, pws=1, dwd=6,
    dwu="hours"> (File f) {
    println(f, weatherForcast( wh, i ));
}
Main {
    ...
        ic= new IncomingDataSeriesChannel(NextHourForecast( ), new File("ForecastWeatherFile.txt"));
    ...
}
```

The generated code is illustrated below. All the code that has been written or indirectly specified by the programmer is in bold. The remainder of the code is generated, with explanations given in the form of comments.

```
structure Weather {
    ...
}
pws = 1
dwd=6
unit= "hours"
File f=new File("ForecastWeatherFile.txt");
Weather WeatherForecast(Weather[ ] weatherHistory, integer i) {
    Weather w;
    w = ... # use models for weather forecast
    return w;
}
NextHourForecast( Weather[]wh, integer i, pws=1, dwd=6, dwu=
    "hours", File f) {
    println(f, weatherForcast( wh, i ));
}
// Array containing both dependence and processing windows.
structure Weather[pws]wh;
pwc=0 # count of the number of tuples that are currently stored in w.
```

-continued

```
/* Initialize to the latest value received in the dependence window: */
currentWS = 0
dws = 0
/* The programming system converts the processing of individual tuples,
as shown above, into the processing of all tuples buffered with a loop
construct. */
onGettingTuple( Weather w, File f) {
   Adjust the size of array wh as needed;
   set wh[currentWS] = w;
   /* The number of tuples in the dependence window is determined
using the time interval rather than its size. The actual size of the
dependence window is therefore computed dynamically in the
following statements. */
   if (time difference between wh[currentWS]and wh[0] <= duration) {
       dws++;
   }
   else {
       pwc++;
   }
   /* Both processing and dependence windows are buffered. The
computation on the tuples in the processing window may be applied. */
   if pwc == pws {
       for i = dws to dws + pws - 1 do {
           NextHourForecast( wh, i, pws, dwd, unit, f);
       }
       shift latest dws tuples in wh to wh[0]to wh[dws-1]
       currentWS = dws
   }
}
Main {
         ic=   new    IncomingDataSeriesChannel(onGettingTuple( ),
new File("ForecastWeatherFile.txt"));
}
```

The simplification of the code written to process tuples and the simplification of performance tuning leads to executable code that is more efficient and less error-prone. It is the explicit combination of processing and dependence windows, together with the tuple-centric programming that makes programs simpler to write.

Instead of relying on complex and inefficient compiling techniques to generate code that discovers dependencies between tuples, the method and system allow the programmer to specify what she/he intuitively understands from the function of the application being written.

Conventionally in stream processing systems, the dependencies between tuples are handled by application programmers and the language constructs for handling tuples are not data or tuple centric. The resulting code is complex to write and error-prone. A compiler may attempt to determine the dependencies between tuples; in the same way it is done in parallel processing languages and systems. However, the dependencies are often difficult to determine because the processing may make a series of call to methods, functions, procedures, or other processing abstractions.

Accelerating a development process is frequently a target goal. Providing a solution to answer to this problem is a real contribution to the big data world.

Figure 6:
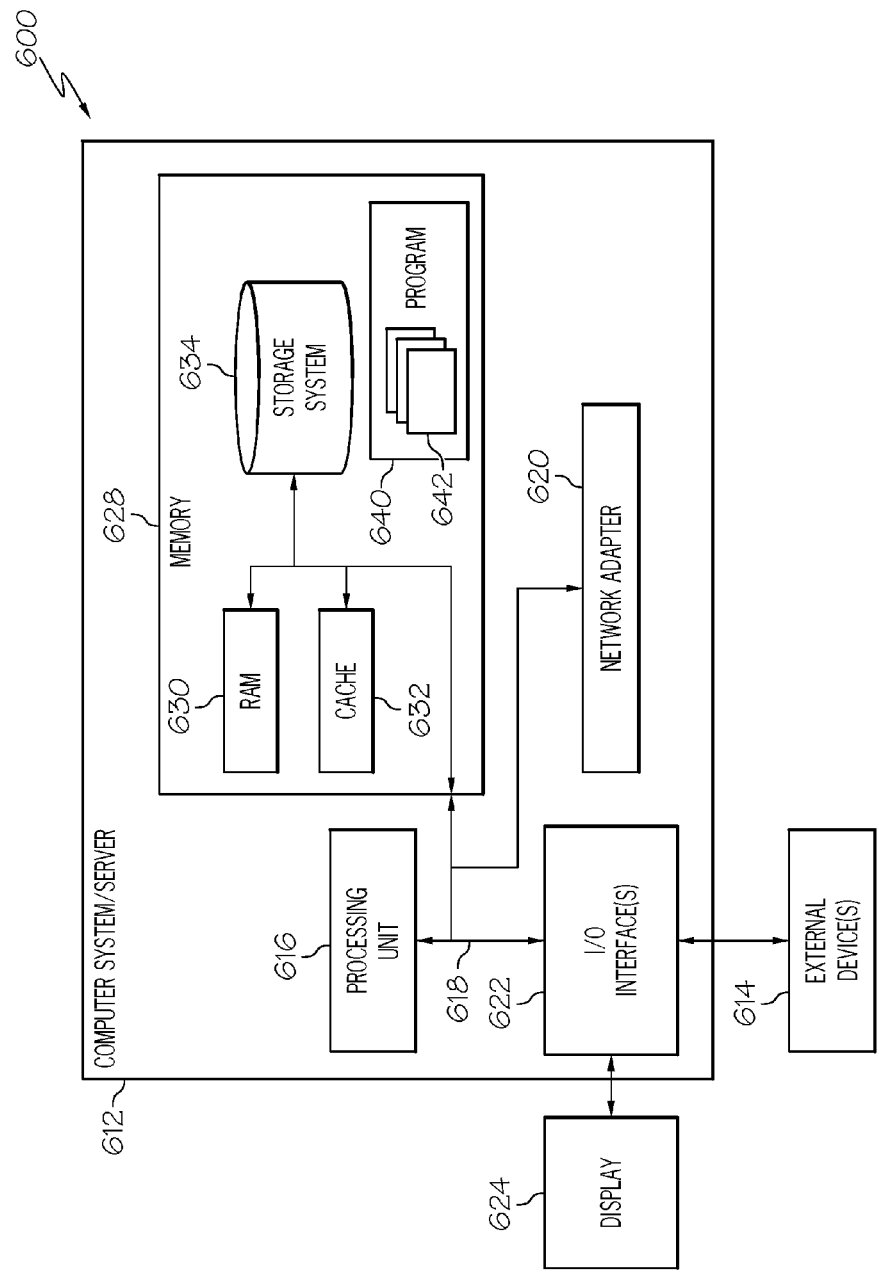
FIG. 6 is a block diagram of an embodiment of a computer system or cloud server in which the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
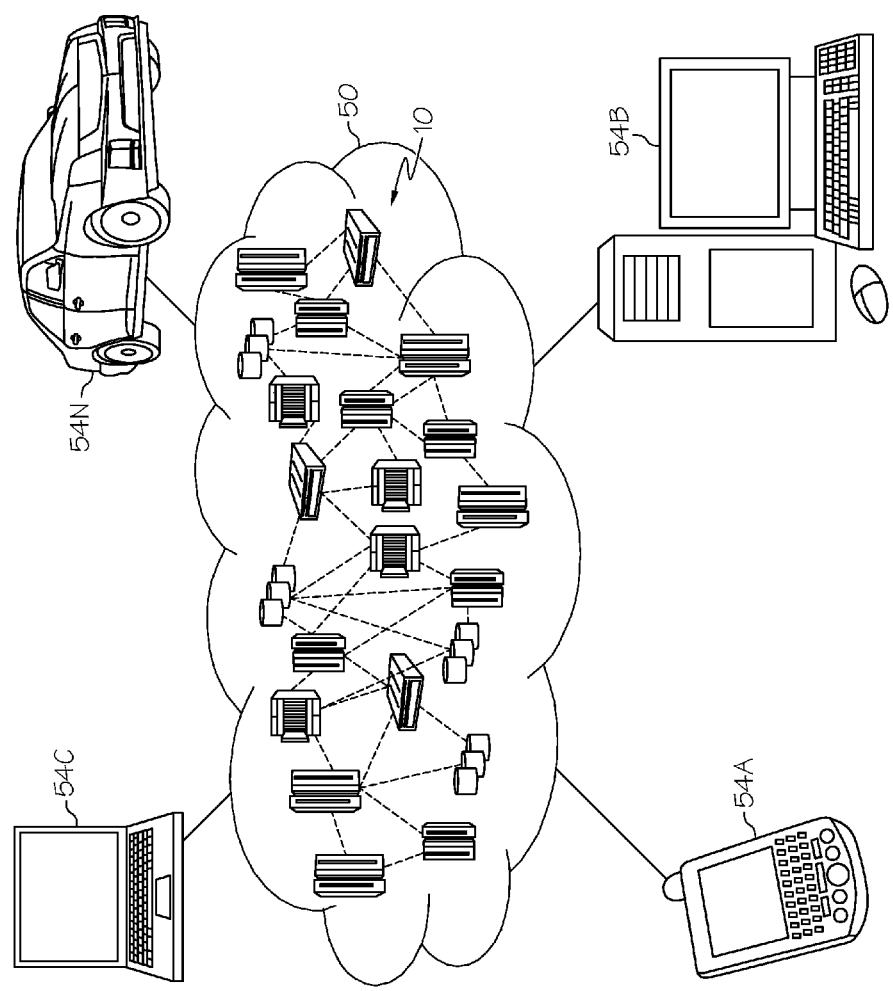
FIG. 7 is a schematic diagram of a cloud computing environment in which the present invention may be implemented.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
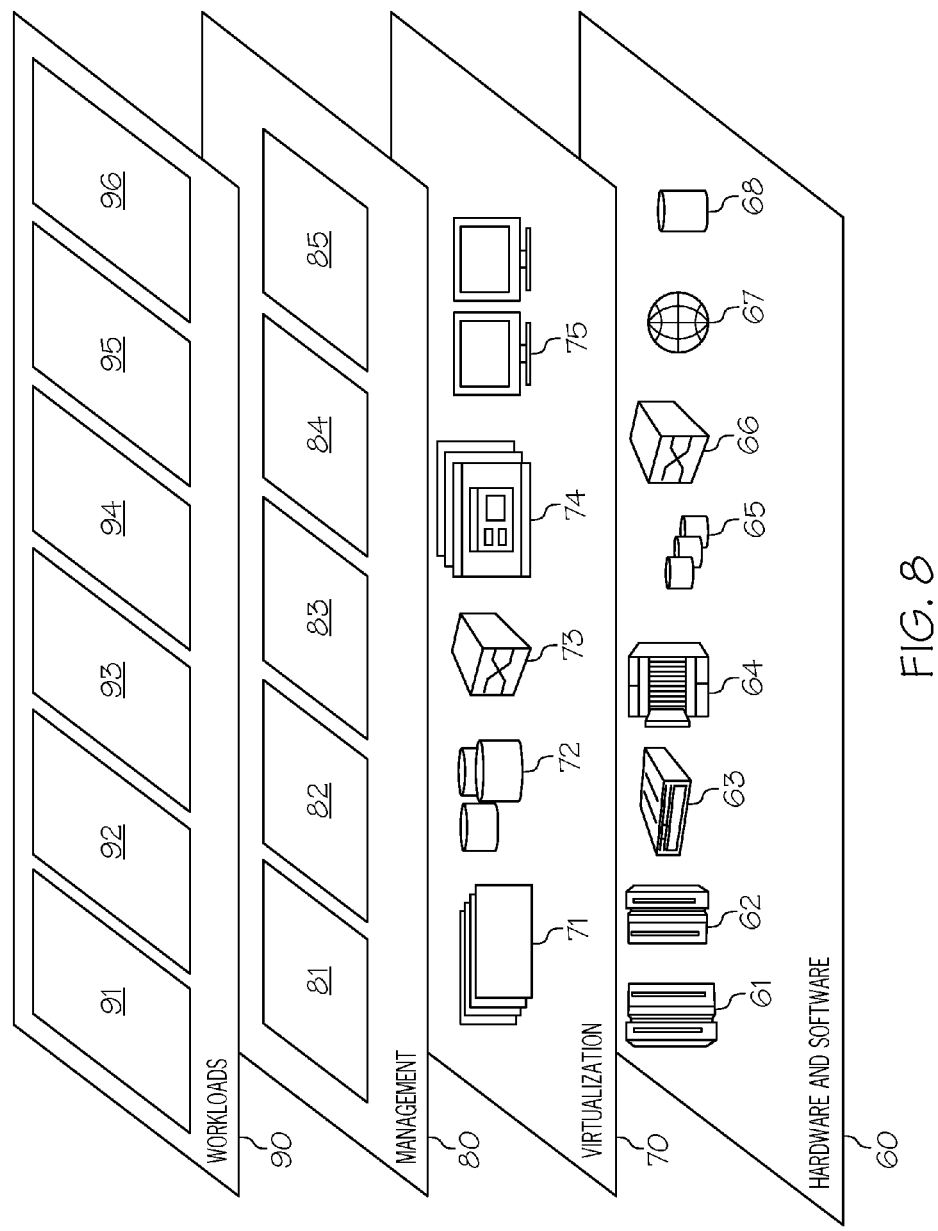
FIG. 8 is a diagram of abstraction model layers of a cloud computing environment in which the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and programming compilation or pre-processing 96, which performs one or more of the features of the present invention described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:
    program instructions to receive source code, wherein the source code includes:
        code to be applied in a sequential series to one or more tuples;
        a definition of a size of a sequence of tuples to be processed as a processing window; and
        a size of a sequence of earlier tuples that a current tuple depends upon as a dependence window;
    program instructions to generate code for real-time stream processing by:
        buffering received time sequence tuples in a buffer in accordance with the processing window and the dependence window; and
        converting the code to be sequentially applied to the one or more tuples into converted code for buffered tuples with a loop construct;
    program instructions to generate code for checking that all tuples in the processing window have been buffered; and
    program instructions to generate code for applying the converted code to each tuple in the processing window.

2. The computer system as claimed in claim 1, wherein a size of the processing window and a size of the dependence window are defined as a number of tuples or a duration of time in which tuples are received.

3. The computer system as claimed in claim 2, wherein the size of the processing window and the dependence window are defined as a number of tuples, and wherein a maximum size of the buffer is a number of tuples in the processing window plus a number of tuples in the dependence window.

4. The computer system as claimed in claim 2, wherein the size of the dependence window is defined as a duration of time and a size of the buffer is computed dynamically.

5. The computer system as claimed in claim 1, further comprising:
    program instructions to generate code for, once a processing window is processed, keeping remaining dependence window tuples in the buffer for a next processing window of tuples.

6. The computer system as claimed in claim 1, further comprising:
    program instructions to generate code for processing boundary tuples, wherein the boundary tuples do not have required dependency tuples available.

7. The computer system as claimed in claim 1, wherein buffering the received time sequence tuples in a buffer includes initializing to a latest dependency tuple in the buffer.

8. The computer system as claimed in claim 1, further comprising:
    program instructions to output the generated code with stream processing.

9. A computer program product for generating code for real-time stream processing wherein data is streamed in the form of tuples wherein each tuple has a timestamp and a value, the computer program product comprising a computer readable storage medium having program instructions embodied therewith, the program instructions executable by a processor to cause the processor to:
  receive source code, wherein the source code includes:
    code to be applied in a sequential series to one or more tuples;
    a definition of a size of a sequence of tuples to be processed as a processing window; and
    a size of a sequence of earlier tuples that a current tuple depends upon as a dependence window;
  generate code for real-time stream processing by:
    buffering received time sequence tuples in a buffer in accordance with the processing window and the dependence window; and
    converting the code to be sequentially applied to the one or more tuples into converted code for buffered tuples with a loop constructs;
  generate code for checking that all tuples in the processing window have been buffered; and
  generate code for applying the converted code to each tuple in the processing window.

\* \* \* \* \*